No. 616,284. Patented Dec. 20, 1898.
J. M. BAKER, V. A. CHALKER, H. G. BAKER & L. O. FERGUSON.
FRUIT CLEANER, BRUSHER, AND WASHER.
(Application filed Jan. 20, 1898.)
(No Model.) 2 Sheets—Sheet 1.
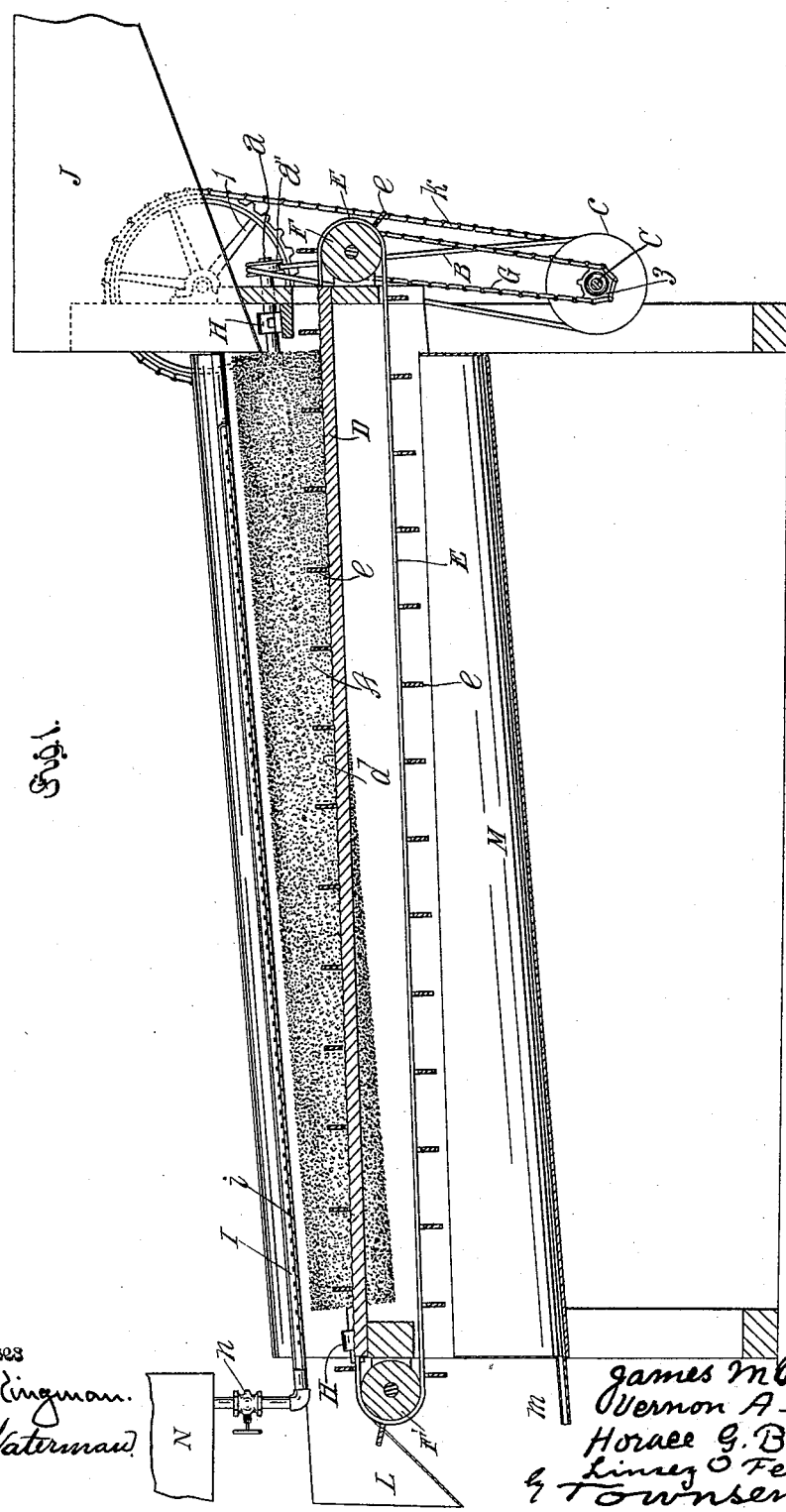

No. 616,284. Patented Dec. 20, 1898.
J. M. BAKER, V. A. CHALKER, H. G. BAKER & L. O. FERGUSON.
FRUIT CLEANER, BRUSHER, AND WASHER.
(Application filed Jan. 20, 1898.)
(No Model.) 2 Sheets—Sheet 2.
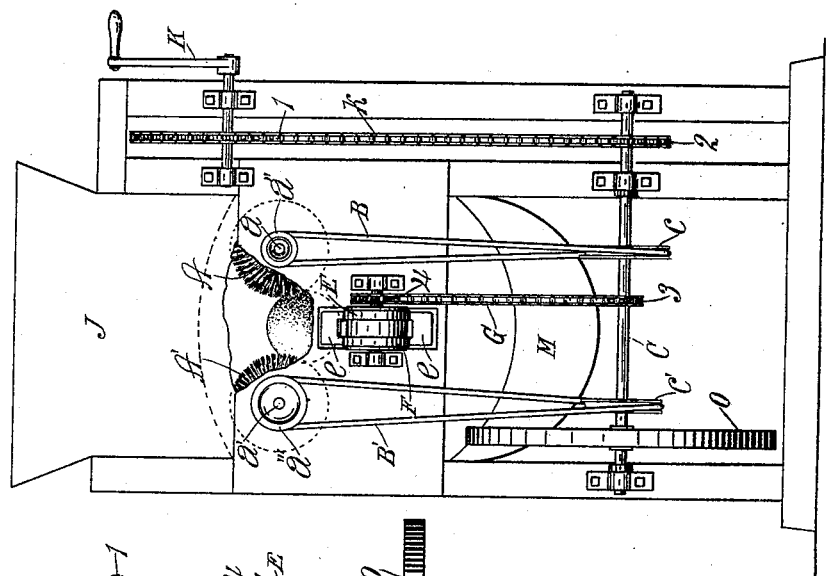
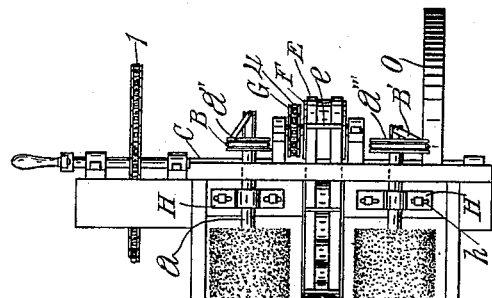
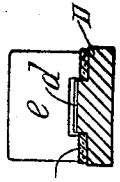
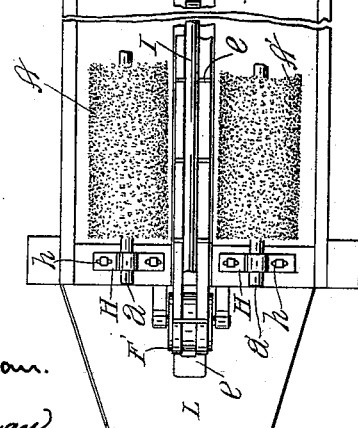
Witnesses
Geo. Kingman.
E. A. Waterman.
Inventors
James M. Baker
Vernon A Chalker
Horace G. Baker
Linsey O. Ferguson
by Townsend Bros.
Their Attys.

UNITED STATES PATENT OFFICE.

JAMES M. BAKER, OF GLENDORA, VERNON A. CHALKER, OF COVINA, HORACE G. BAKER, OF GLENDORA, AND LINDSEY O. FERGUSON, OF LOS ANGELES, CALIFORNIA.

FRUIT CLEANER, BRUSHER, AND WASHER.

SPECIFICATION forming part of Letters Patent No. 616,284, dated December 20, 1898.

Application filed January 20, 1898. Serial No. 667,340. (No model.)

*To all whom it may concern:*

Be it known that we, JAMES M. BAKER, a resident of Glendora, VERNON A. CHALKER, a resident of Covina, HORACE G. BAKER, a resident of Glendora, and LINDSEY O. FERGUSON, a resident of Los Angeles, in the county of Los Angeles and State of California, have invented a new and useful Fruit Cleaner, Brusher, and Washer, of which the following is a specification.

One object of this invention is to provide a superior, though simple, fruit-cleaning machine which will thoroughly brush and polish or brush and wash oranges, lemons, and other fruit which may require cleaning and to do this without bruising or otherwise injuring the fruit.

Another object of our invention is to provide a fruit-washing machine in which the water will not soak nor injure the brushes and which will apply the water in the most effective way. In our newly-invented fruit-cleaner the water is applied above the fruit, but not directly above the brushes. The fruit is supported by a fruit-rest between the brushes. A perforated pipe is arranged above the rest, and an endless belt with carriers is arranged to slide the fruit positively along the rest, while the brushes operate against the sides of the fruit and rotate downward and inward toward the rest. The water applied to the fruit does not drip upon the brushes. The centrifugal force of the rotating brushes prevents the water which may be squirted onto the brushes from flowing along the bristles to the body of the brushes.

Our newly-invented fruit-cleaner comprises two rotary brushes having a considerable length and arranged side by side, an endless belt provided with fruit-carriers arranged to run along lengthwise of said brushes to carry the fruits along from end to end of said brushes in contact with the peripheries of both of said brushes, means for rotating the brushes, and means for driving the endless belt. The said endless belt with its fruit-carriers is arranged to run in a path oblique to the plane of the axes of said brushes, so that the said belt is closer to the said plane at the tail of the machine than at the feed end of the machine, thus to readily operate upon different-sized fruits. By preference the brushes slant downward from the feed end to the tail end in order to produce this obliquity between the plane of the brushes and the plane of the carrier, and the brushes also slant toward each other toward the tail of the machine, so as to more readily clean different sizes of oranges without requiring them to be graded. The machine is adjustable within certain limits by making the boxing of the brush-shafts adjustable, so that the brushes can be placed closer or farther apart and may also be placed at a greater or less obliquity toward each other. A stationary fruit rest or support is also provided, upon which the fruit rests as it moves from one end of the machine to the other, and the endless belt of the carriers is made in two members, one on each side of said rest, and the carriers bridge over the rest from one belt member to the other.

The invention includes other features which we will hereinafter more fully point out and claim.

The accompanying drawings illustrate our invention.

Figure 1 is a longitudinal vertical mid-section of our newly-invented fruit-cleaner. Fig. 2 is a fragmental plan of the same. Fig. 3 is an elevation of the feed end of the machine. Fig. 4 is a cross-section of the fruit-rest and the carrier-belt and showing one of the carriers in elevation. Fig. 5 is a longitudinal fragmental section of the carrier on a larger scale.

A A' indicate the two rotary brushes mounted on shafts or spindles $a$ $a'$, respectively, which carry pulleys $a''$ $a'''$, driven by belts B B', which are driven from a power-shaft C, which has pulleys $c$ $c'$ for driving said belts B B', respectively. The machine is geared so that one of the brushes, as at A, will be driven faster than the other brush, as at A', the diameter of the brushes being practically the same, so that the action of one of the brushes upon the fruit is much more rapid than that of the other brush, thus to cause the fruit to rotate under the action of the brushes. The brushes may be geared to rotate in opposite directions or in the same direction, as may be desired, preferably in opposite directions toward each other and thence toward the fruit.

D indicates a fruit-rest, preferably having a wavy upper surface d, which is located beneath the plane of the axes of the brushes and midway between verticals drawn from said axes, so as to form the floor of a passage for the fruits, the top of which passage is formed by the two brushes. This passageway preferably tapers from head to tail of the machine.

E indicates an endless belt provided with carriers e, which bridge the rest D. The belt is carried by pulleys F F', driven by a sprocket-chain G, which is driven from the power-shaft C.

H indicates the movable boxes for the brush shafts or spindles a a', slots h being provided to allow the lateral adjustment of the brushes.

I indicates a water-pipe provided with perforations i, arranged in three rows, one row along the bottom and a row along each side of the bottom row, so as to direct the water downward onto the fruit and sidewise onto the brushes while the same are in operation for washing fruit.

In practical operation to brush and polish oranges dry the oranges will be fed into the hopper J, which feeds the fruit to the belt, and the brushes will be driven by the crank K or any other suitable means for applying power to the shaft C. The carriers e will catch the oranges and pull them along over the wavy surface d of the fruit-rest, and the brushes rotating in contact with the fruit will rotate the fruit, turning the top of the fruit toward the brush that turns most rapidly, and the wavy surface of the rest assists to cause the fruit to roll under the action of the brushes along the wavy surface, and in this manner the fruit is turned so that before the fruit has passed through the machine every part of the fruit will be brought into contact with the rotating brushes. The fruit finally passes out at the tail L of the machine. If it is desired to wash the fruit, water is supplied through the pipe I and squirts through the perforations i down onto the fruit and sidewise onto the brushes, and thence runs down into the trough M, and thence down the machine into waste-pipe m.

N indicates a tank for supplying water to the pipe I.

n indicates a valve for shutting off the water.

It is to be understood that the machine may be connected directly with a hydrant or any other water-supply.

O indicates a balance-wheel for the shaft C.

A sprocket-chain k is shown for communicating the power from the shaft K to the shaft C.

1 2 3 4 indicate the sprocket-wheels for the sprocket-chains k and G.

The wavy surface of the fruit-rest D is preferably covered with a strip of rubber, as clearly shown at d in Fig. 4.

An orange is shown in Figs. 2 and 3 in position to be brushed or washed.

Now, having described our invention, what we claim as new, and desire to secure by Letters Patent, is—

1. The combination of two rotary brushes of considerable length; an endless belt provided with fruit-carriers and arranged to run along lengthwise of said brushes in a path oblique to the plane of the axes of said brushes to carry the fruits along lengthwise of said brushes in contact with the peripheries of said brushes; means for rotating the brushes; and means for driving the endless belt.

2. The combination of two rotary brushes having considerable length; a fruit-rest having a wavy surface and extending along lengthwise of said brushes to hold the fruit in contact with the peripheries of said brushes; an endless belt provided with fruit-carriers and arranged to run along lengthwise of said brushes to carry the fruits along said fruit-rest and in contact with the peripheries of said brushes; means for rotating the brushes; and means for driving the endless belt.

3. A fruit-cleaner having two rotary brushes of considerable length arranged side by side and a fruit-support with endless belt arranged to form with the brushes a fruit passage-way tapering from head to tail of the machine, and means for rotating the brushes and driving the belt.

JAMES M. BAKER.
VERNON A. CHALKER.
HORACE G. BAKER.
LINDSEY O. FERGUSON.

Witnesses:
JAMES R. TOWNSEND,
F. M. TOWNSEND.